US011112929B2

(12) United States Patent
Shtilkind et al.

(10) Patent No.: US 11,112,929 B2
(45) Date of Patent: Sep. 7, 2021

(54) PERSONALIZED GRAPHICAL USER INTERFACES FOR ENTERPRISE-RELATED ACTIONS

(71) Applicant: ServiceNow, Inc., Santa Clara, CA (US)

(72) Inventors: Eugene Aaron Shtilkind, San Diego, CA (US); Omid Borjian, Antelope, CA (US); Sancho Savio Pinto, Alameda, CA (US); Ofer Vaisler, San Jose, CA (US); Samuil Tomushev, San Francisco, CA (US); Alap Kaushik Patel, Fremont, CA (US); Daniel Glazer, Tel Aviv (IL); Inbal Litvin, rishon lezion (IL); Boaz Zvi Hecht, Foster City, CA (US)

(73) Assignee: ServiceNow, Inc., Santa Clara, CA (US)

(*) Notice: Subject to any disclaimer, the term of this patent is extended or adjusted under 35 U.S.C. 154(b) by 77 days.

(21) Appl. No.: 16/402,059

(22) Filed: May 2, 2019

(65) Prior Publication Data
US 2020/0348798 A1 Nov. 5, 2020

(51) Int. Cl.
*G06F 3/048* (2013.01)
*G06F 3/0481* (2013.01)
*G06F 16/903* (2019.01)
*G06F 3/0482* (2013.01)
*G06F 3/0485* (2013.01)

(52) U.S. Cl.
CPC .......... *G06F 3/0481* (2013.01); *G06F 3/0482* (2013.01); *G06F 3/0485* (2013.01); *G06F 16/90335* (2019.01)

(58) Field of Classification Search
None
See application file for complete search history.

(56) References Cited

U.S. PATENT DOCUMENTS

| 6,609,122 B1 | 8/2003 | Ensor |
| 6,678,887 B1 | 1/2004 | Hallman |
| 7,028,301 B2 | 4/2006 | Ding |

(Continued)

OTHER PUBLICATIONS

JavaScriptCore, Apple Developer Documentation, downloaded from https://developer.apple.com/documentation/javascriptcore on Jul. 9, 2018.

(Continued)

*Primary Examiner* — Mandrita Brahmachari
(74) *Attorney, Agent, or Firm* — Fletcher Yoder PC

(57) ABSTRACT

A first example embodiment may involve obtaining, by a mobile device associated with a particular user, representations of: (i) a first set of custom enterprise-related actions that are specific to the particular user, and (ii) a second set of general enterprise-related actions that are applicable to multiple users. The first example embodiment may further involve generating and displaying, on a screen of the mobile device, a scrollable graphical user interface including an ordering of actuatable user interface elements including: actuatable user interface elements for a search text box, followed by actuatable user interface elements for the first set of custom enterprise-related actions, followed by actuatable user interface elements for the second set of general enterprise-related actions.

20 Claims, 13 Drawing Sheets

(56) References Cited

U.S. PATENT DOCUMENTS

| | | |
|---|---|---|
| 7,062,683 B2 | 6/2006 | Warpenburg |
| 7,131,037 B1 | 10/2006 | LeFaive |
| 7,170,864 B2 | 1/2007 | Matharu |
| 7,272,782 B2 | 9/2007 | Sneh |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,783,744 B2 | 8/2010 | Garg |
| 7,890,802 B2 | 2/2011 | Gerber |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,250,169 B2 | 8/2012 | Beringer et al. |
| 8,266,096 B2 | 9/2012 | Navarrete |
| 8,457,928 B2 | 6/2013 | Dang |
| 8,478,569 B2 | 7/2013 | Scarpelli |
| 8,674,992 B2 | 3/2014 | Poston |
| 8,689,241 B2 | 4/2014 | Naik |
| 8,726,176 B2 | 5/2014 | Beringer |
| 8,743,121 B2 | 6/2014 | De Peuter |
| 8,887,133 B2 | 11/2014 | Behnia |
| 8,983,982 B2 | 3/2015 | Rangarajan |
| 9,164,656 B1* | 10/2015 | Keller ............... G05B 19/41865 |
| 9,239,857 B2 | 1/2016 | Trinon |
| 9,508,051 B2 | 11/2016 | Falk |
| 9,535,674 B2 | 1/2017 | Cooper |
| 9,535,737 B2 | 1/2017 | Joy |
| 9,557,969 B2 | 1/2017 | Sharma |
| 9,792,387 B2 | 10/2017 | George |
| 9,942,342 B2 | 4/2018 | Braun |
| 10,089,676 B1* | 10/2018 | Gupta ................ G06Q 30/0633 |
| 10,853,100 B1* | 12/2020 | Kathpalia ......... G06F 16/24578 |
| 2003/0142125 A1* | 7/2003 | Salmimaa ......... H04M 1/72544 715/733 |
| 2003/0197733 A1* | 10/2003 | Beauchamp ........... G06Q 10/10 715/764 |
| 2004/0012625 A1 | 1/2004 | Lei et al. |
| 2007/0214425 A1* | 9/2007 | Bala ...................... G06F 3/0481 715/764 |
| 2007/0220505 A1* | 9/2007 | Bukovec ................. G06F 8/60 717/168 |
| 2008/0147671 A1 | 6/2008 | Simon et al. |
| 2008/0172362 A1* | 7/2008 | Shacham ............... G06F 16/35 |
| 2008/0215560 A1* | 9/2008 | Bell ...................... G06F 16/248 |
| 2011/0055385 A1* | 3/2011 | Tung ................... H04L 43/065 709/224 |
| 2012/0059795 A1* | 3/2012 | Hersh ...................... G06F 7/78 707/628 |
| 2012/0239451 A1* | 9/2012 | Caligor ................. G06Q 10/00 705/7.21 |
| 2012/0278388 A1* | 11/2012 | Kleinbart .............. G06Q 10/06 709/204 |
| 2014/0012616 A1* | 1/2014 | Moshenek ..... G06Q 10/063114 705/7.15 |
| 2014/0201654 A1* | 7/2014 | Wilhelm .................. G06F 8/34 715/765 |
| 2014/0245015 A1 | 8/2014 | Velamoor et al. |
| 2014/0379699 A1* | 12/2014 | Blyumen ............ G06F 3/04842 707/722 |
| 2015/0170300 A1* | 6/2015 | Wilson .................. G06Q 50/16 705/313 |
| 2015/0356614 A1* | 12/2015 | Makedonov ....... G06Q 30/0267 705/7.21 |
| 2016/0098172 A1* | 4/2016 | Bacinschi ................ G06F 8/38 715/747 |
| 2016/0132214 A1* | 5/2016 | Koushik ................. H04L 63/10 715/741 |
| 2017/0235436 A1* | 8/2017 | Hooton ................ G06F 3/0482 705/7.11 |
| 2018/0300022 A1* | 10/2018 | Kumar ............... G06F 16/9535 |

OTHER PUBLICATIONS

U.S. Appl. No. 62/009,341, entitled "System and Method for Displaying Database Content on a Client Device,", filed Jun. 9, 2014.

* cited by examiner

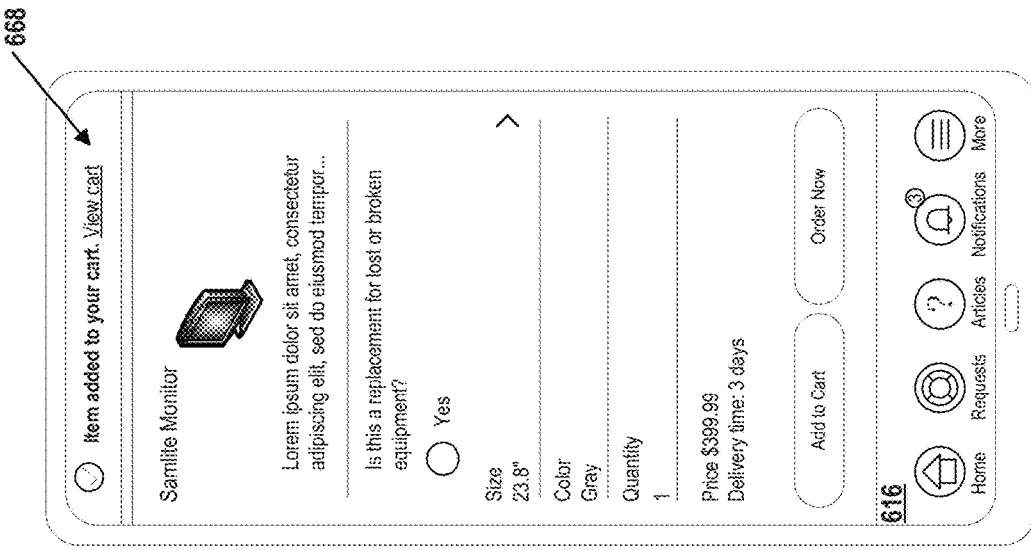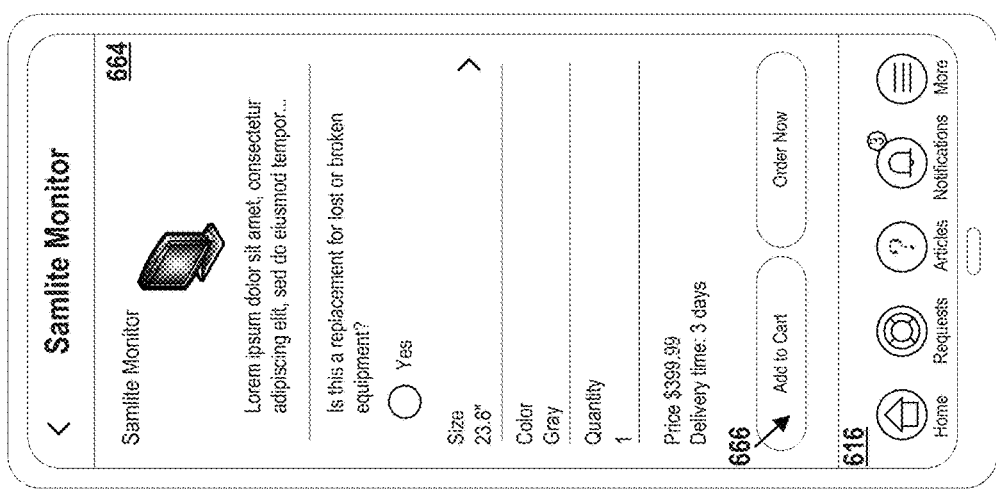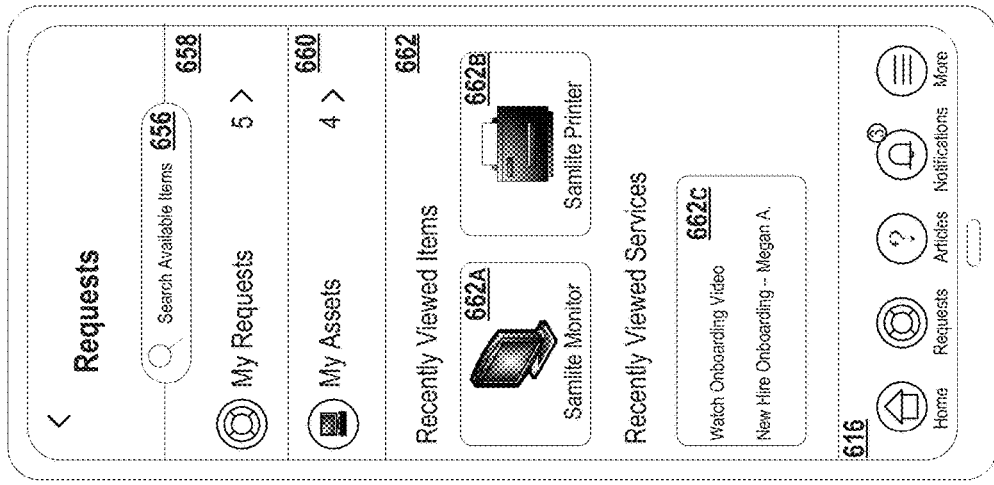
FIG. 6D

PERSONALIZED GRAPHICAL USER INTERFACES FOR ENTERPRISE-RELATED ACTIONS

BACKGROUND

Users in large-scale enterprises typically use their mobile devices to find company information such as policies and/or request enterprise-related actions and tasks, such as submitting work orders or completing human resource forms. These mobile devices may display representations of graphical user interfaces through which the user can complete a task. However, these graphical user interfaces may be generic and overcomplicated. As a result, it may take a user an inordinate amount of time to find and complete a task. Further, these graphical user interfaces may reroute users to external uniform resource locators (URLs) to complete tasks, which can result in confusion and navigation difficulty for the user.

SUMMARY

Enterprise management may involve assigning enterprise-related actions to a number of different types of users for completion, such as completing human resource forms, employee training, and delivering computer systems. These enterprise-related actions can be viewed by employees in a number of different ways, including via a mobile device. However, mobile devices have limited screen size, which may result in a daunting, non-user-friendly experience when trying to view and locate certain enterprise-related actions and other information.

In order to remedy this problem, the embodiments herein provide for a compact, personalized graphical user interface (GUI) that is organized in such a way that the enterprise-related actions most relevant to the user are easily accessible. For instance, a search bar may be provided on the home page of the GUI, allowing users to quickly and efficiently find the enterprise-related action for which they are looking. Below the search bar, personalized requests and tasks may be displayed, allowing users to quickly view enterprise-related items that are specific to them. Below the personalized items, the most relevant enterprise-related actions may be displayed, allowing users to view potentially relevant items and popular items. The relevance of the enterprise-related actions is determined in part by observations of how the majority of users interact with the GUI in an enterprise context. For example, if many users are searching for a particular article relating to enterprise procedures, then that article might be placed first in a list of articles on the GUI. The placement of various items might change over time depending on the types of items with which users are interacting and for which the users are searching.

The personalization and relevance of the enterprise-related items combined with the compact organization of the GUI provides users with a seamless experience. This is particularly beneficial in an enterprise context because it allows users to spend less time searching for enterprise-related actions and more time completing them.

Accordingly, a first example embodiment may be a computer-implemented method that involves obtaining, by a mobile device associated with a particular user, representations of: (i) a first set of custom enterprise-related actions that are specific to the particular user, and (ii) a second set of general enterprise-related actions that are applicable to multiple users. The first example embodiment may further involve generating and displaying, on a screen of the mobile device, a scrollable graphical user interface including an ordering of actuatable user interface elements including: actuatable user interface elements for a search text box, followed by actuatable user interface elements for the first set of custom enterprise-related actions, followed by actuatable user interface elements for the second set of general enterprise-related actions. The first example embodiment may further involve, in response to actuation of a first user interface element for the search text box: (i) obtaining, by the mobile device, search results based on text entered into the search text box, wherein the search results include information related to the first set of custom enterprise-related actions and the second set of general enterprise-related actions, and (ii) generating and displaying, on the screen of the mobile device, a search results graphical user interface containing the search results. The first example embodiment may further involve, in response to actuation of a second user interface element for a particular custom enterprise-related action from the first set, generating and displaying, on the screen of the mobile device, a custom graphical user interface facilitating the particular custom enterprise-related action and tailored to the particular user. The first example embodiment may further involve, in response to actuation of a third user interface element for a particular general enterprise-related action from the second set, generating and displaying, on the screen of the mobile device, a general graphical user interface facilitating the particular general enterprise-related action.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6D depicts custom requests panes of the personalized GUI, in accordance with example embodiments.

FIG. 6E depicts detailed custom requests panes of the personalized GUI, in accordance with example embodiments.

FIG. 6F depicts detailed custom assets panes of the personalized GUI, in accordance with example embodiments.

DETAILED DESCRIPTION

Figure 1:
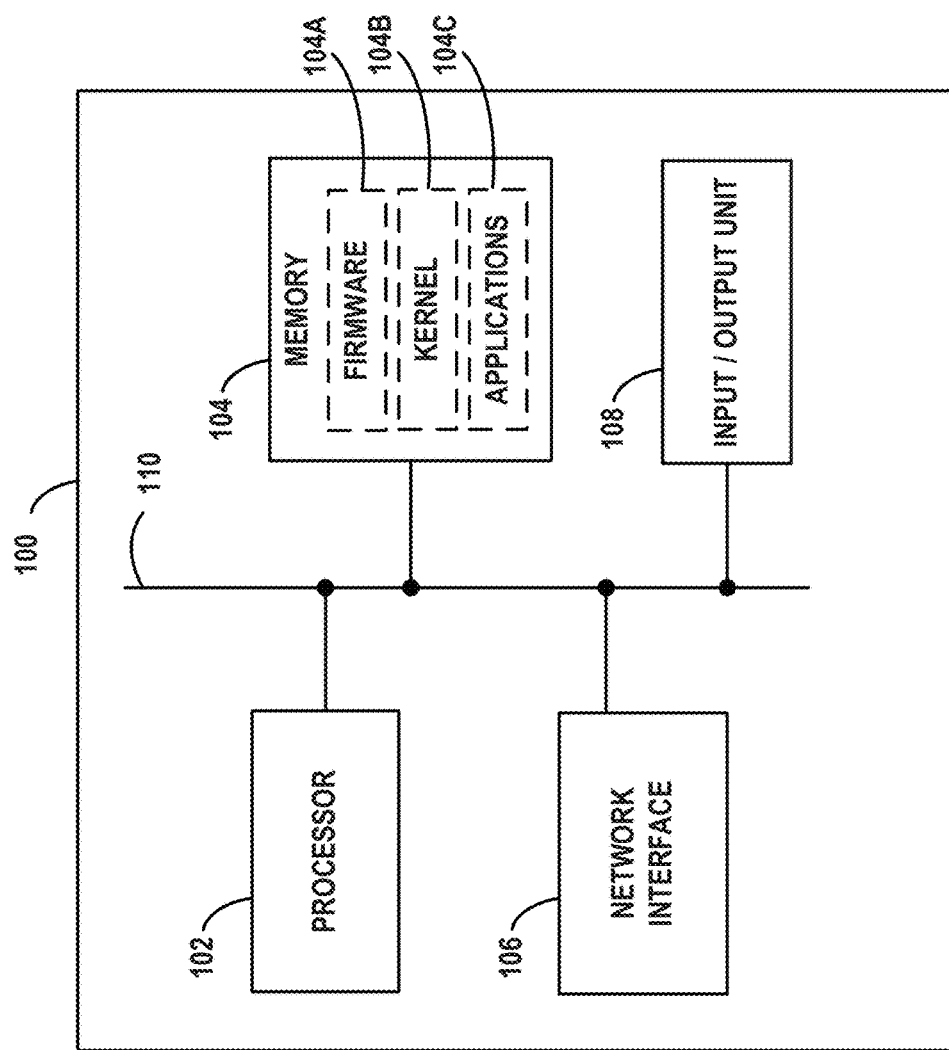
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
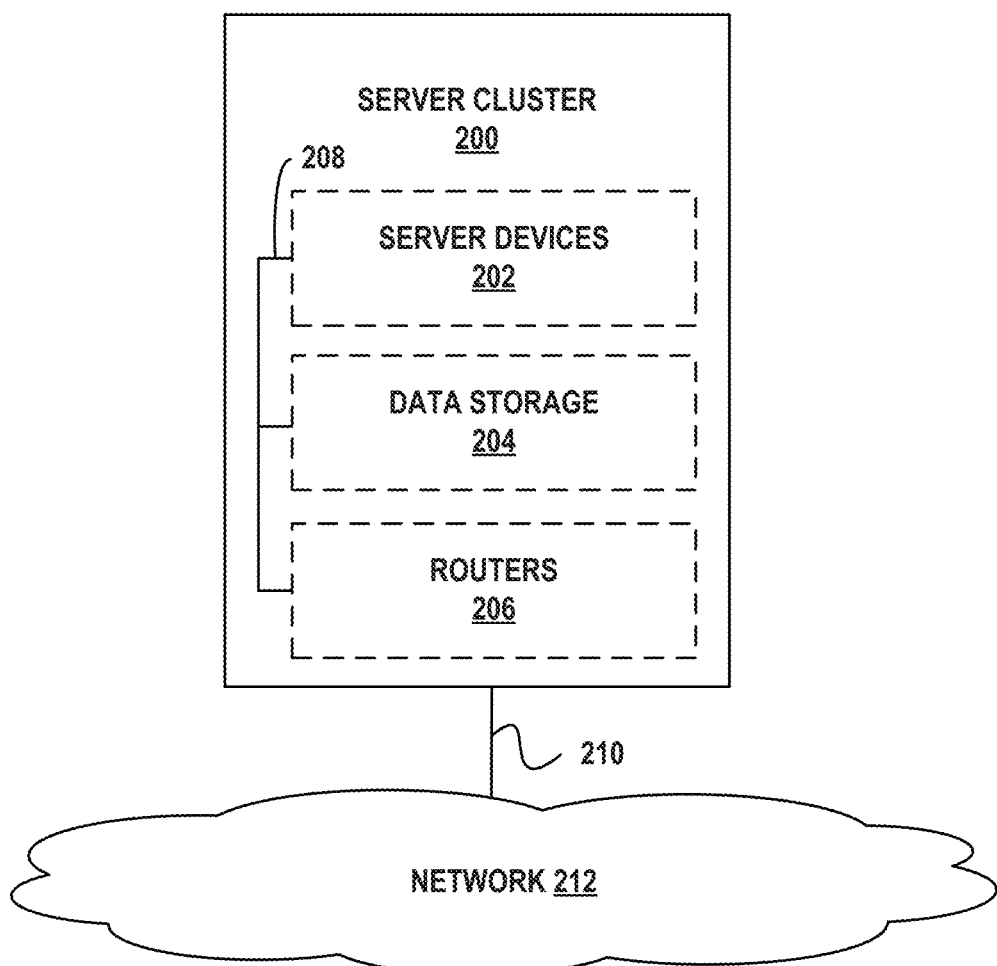
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages.

III. Example Remote Network Management Architecture

Figure 3:
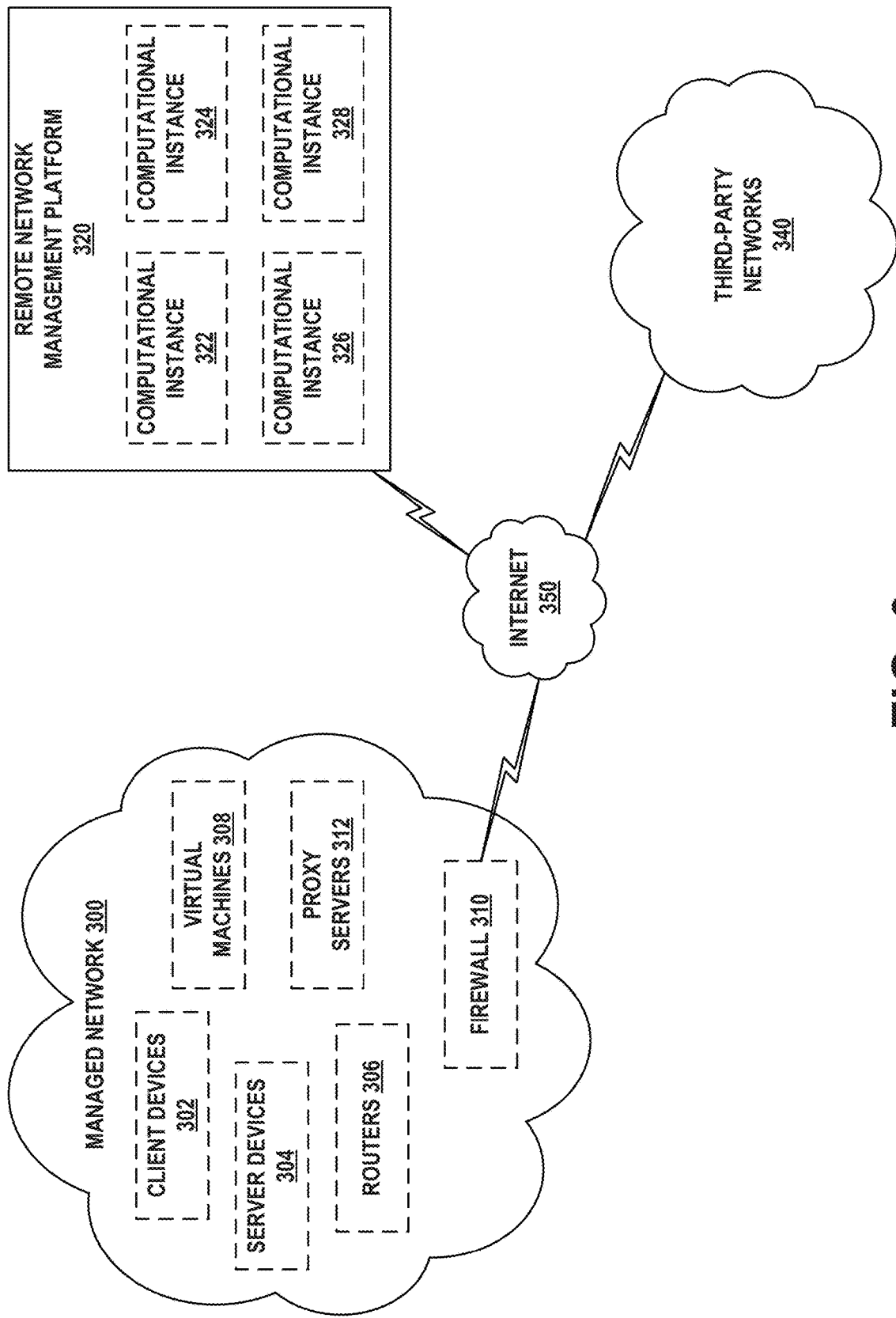
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® AZURE®. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
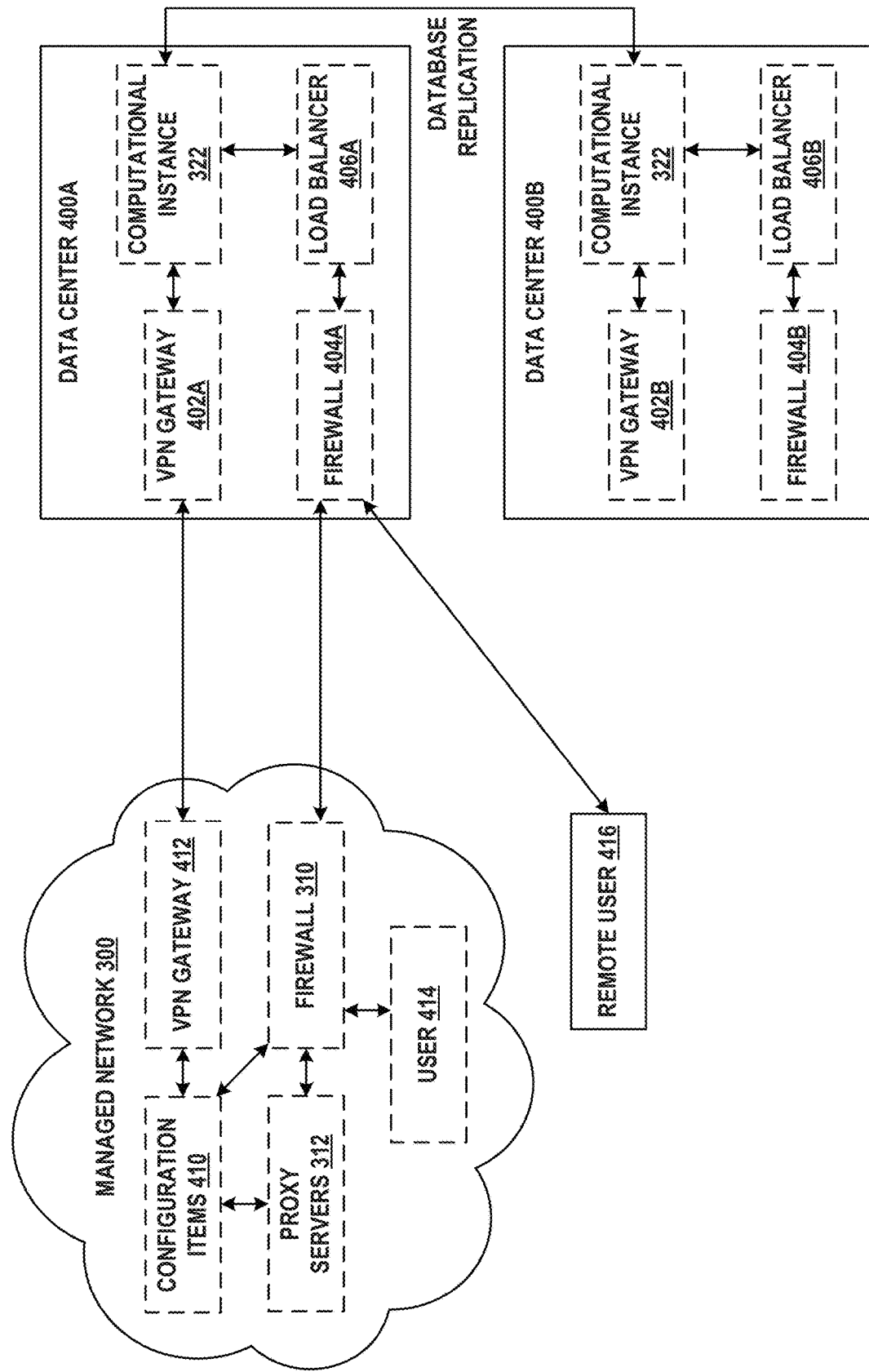
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
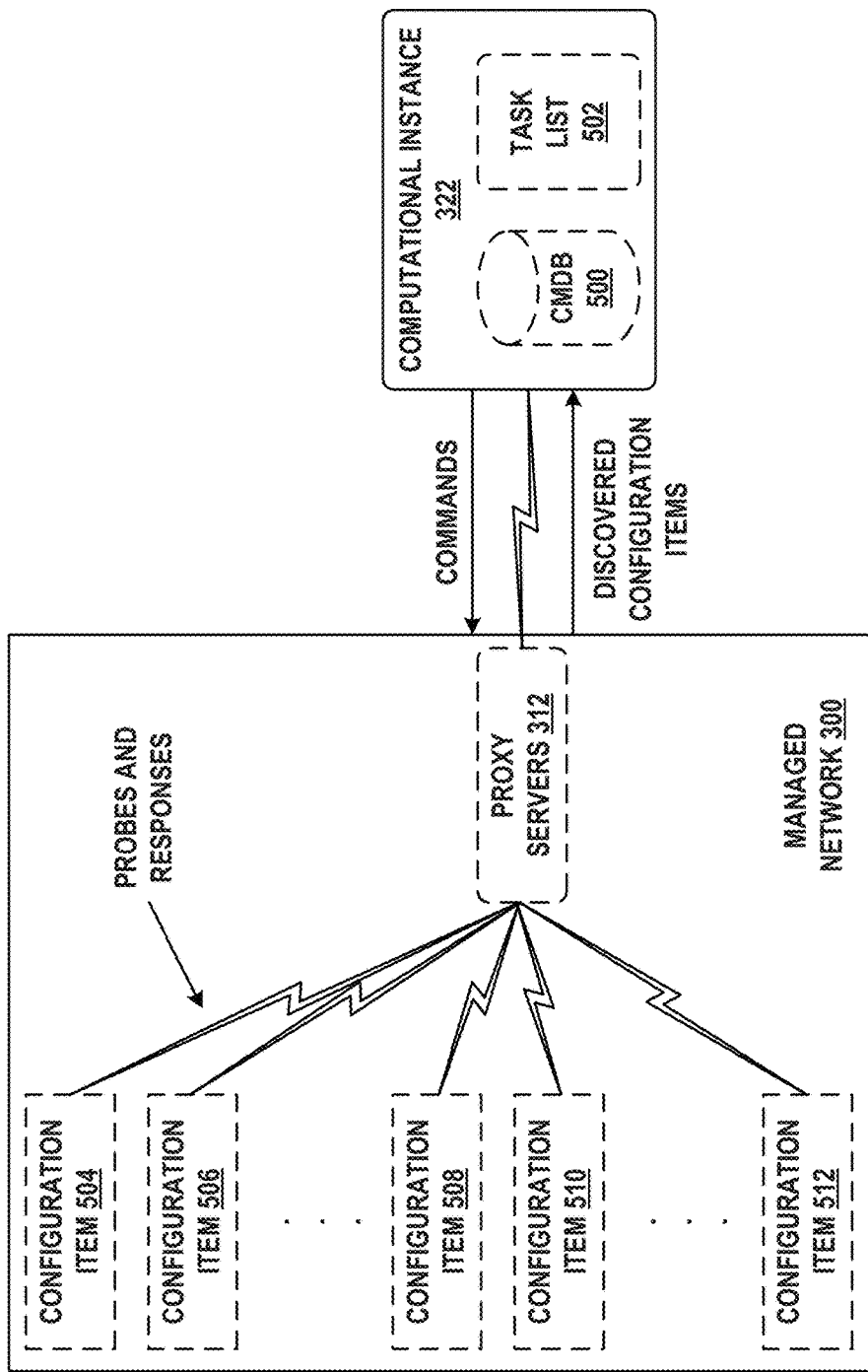
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
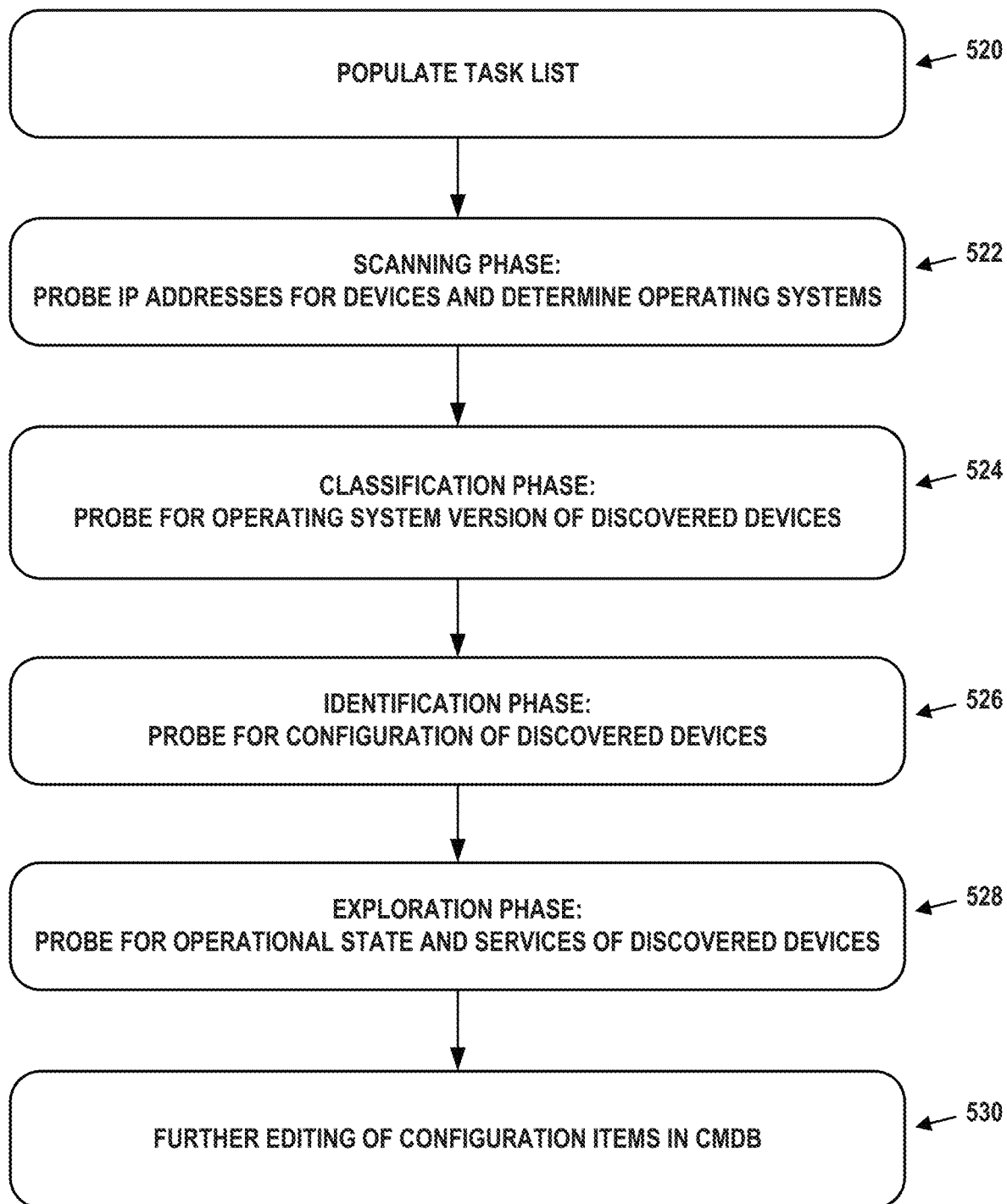
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Personalized Graphical User Interfaces for Enterprise-Related Tasks and Actions As described herein, the term "pane" may refer to a GUI component that contains one or more locations in which to display information, and/or zero or more user-selectable items such as buttons or tabs. In some embodiments, a pane may be equivalent to, or contained within, a page or a GUI window, though such a window may contain multiple panes. Buttons and/or tabs may be graphical control elements that display additional information within the pane. The GUIs and/or panes described herein may be provided to users when they access a computational instance on a remote network management platform, such as computational instance 322 within remote network management platform 320 as described in FIG. 3, or any other server device.

As previously discussed, completing enterprise-related tasks and requests can be cumbersome for both experienced and inexperienced users alike. The embodiments herein address these issues by way of a series of GUI graphical elements that are arranged to be in order of relevance to a particular user. As a result of these embodiments, users can quickly and efficiently manage their enterprise-related actions and tasks, resulting in a cost savings for managed network 300 because users are spending less time searching for tasks and more time completing those tasks.

A large enterprise may have many users connected to managed network 300. These users may be new-hires that have to complete a number of enterprise-related tasks, including, but not limited to watching training videos, completing human resource forms, and/or setting up direct deposit for paychecks. Alternatively, these users may be existing users that may need to submit support tickets for hardware or software issues they are experiencing.

Generally, users can complete tasks or request services through generic GUIs on their desktop or mobile devices that provide the same information to every user. While these GUIs may allow a user to complete tasks or request services, it may take the user an inordinate amount of time to navigate to the desired task or service. Part of this is due to the generic nature of the GUI's layout and content.

In order to streamline the experience for an enterprise user, the embodiments herein include GUIs with graphical elements arranged in the order of most used across part of or the entire enterprise. For example, if users prefer to use a search when looking for tasks or requests, a search bar graphical element may be displayed at the top of an example GUI. Further, graphical elements that represent personalized items for the user, such as tasks and requests, may be less preferred than the search bar graphical element. As such, the graphical elements that represent personalized items may be displayed below the search graphical element. Even further, graphical elements that represent generic items relating to the enterprise may be the least preferred, and thus may be displayed at the bottom of the GUI below the personalized items. While the following example embodiments display the graphical elements in a particular order (e.g., a search bar on top, followed by personalized items in the middle, and generic items on the bottom), the graphical elements can be arranged in any order based on user preference within the particular enterprise associated with managed network 300.

Example panes are shown in FIGS. 6A, 6B, 6C, 6D, 6E, and 6F. These panes may allow a user to easily find and complete a task assigned to them, as well as easily request services or hardware. Other possibilities exist.

Figure 6A:
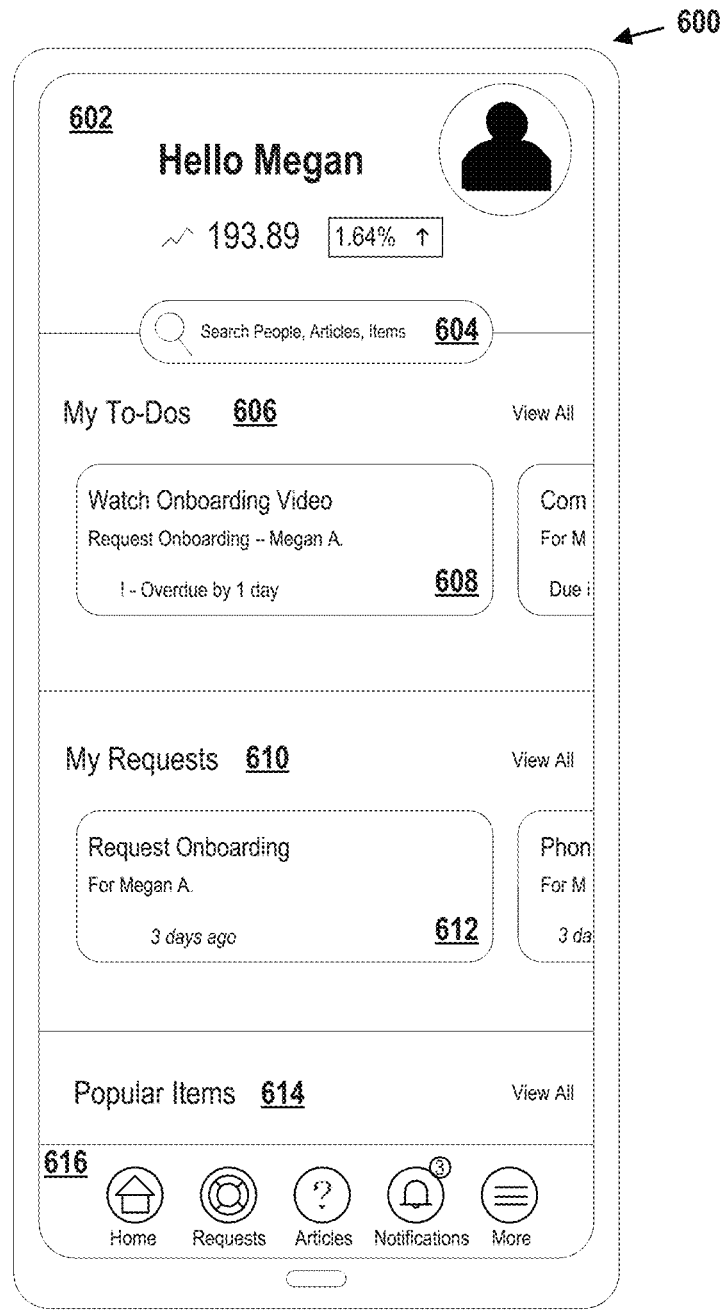
FIG. 6A depicts a home page view of a personalized GUI, in accordance with example embodiments.

FIG. 6A depicts a home page pane of personalized GUI 600 that includes splash screen 602, search bar 604, personalized items 606 and 610, general items 614, and navigation bar 616. Although FIG. 6A depicts GUI 600 being displayed on a mobile phone device, the GUI panes discussed herein can be displayed as web pages or within native applications on any type of computing device.

Splash screen 602 may include a welcome message to the user accessing personalized GUI 600, as well as information related to the enterprise implementing managed network 300. For example, as shown in FIG. 6A, splash screen 602 displays the message "Hello Megan" with the current stock price of the enterprise for which Megan is an employee. Splash screen 602 may include alternative and/or additional information (not shown), such as weather or other location-based information.

Search bar 604 may include a user-definable field that allows a user to enter a string of characters in order to search for information. Once a user enters a string of characters, search bar 604 may be actuatable to cause personalized GUI 600 to display search results relating to the entered string of characters. This may be beneficial as it allows the user to quickly search for the most relevant task, request, or item, without having to navigate through the rest of personalized GUI 600.

Personalized items 606 and 610 may include personalized graphical elements that are specific to the user accessing personalized GUI 600, such as the user's personal tasks and requests. Personalized items 606 include "My To-Dos," which corresponds to the user's enterprise-related tasks that have been assigned to the user. These tasks may include things such as completing training videos and human resource forms (i.e., completing new hire checklists, uploading drivers' licenses, setting up direct deposits, signing non-disclosure agreements, etc.). As shown in FIG. 6A, personalized items 606 includes task 608, which is a user-selectable graphical element that corresponds to a task assigned to the user. Personalized items 610 includes "My Requests," which corresponds to the user's enterprise-related requests that have been submitted by or on behalf of the user. These requests may include things such as requesting new and/or replacement hardware (i.e., new laptops, phones, keyboards, etc.), or requesting services (i.e., training, hardware repair, etc.). As shown in FIG. 6A, personalized items 610 includes request 612, which is a user-selectable graphical element that corresponds to a request submitted by the user accessing personalized GUI 600.

General items 614 may include enterprise-related graphical elements that represent tasks or services are applicable to multiple users within managed network 300. These tasks or services may be crowd-sourced from other users connected to managed network 300 in order to present the user with popular tasks and services. As such, the displayed graphical elements may change based on other users' interactions over time. Further, general items 614 may be tailored and/or not tailored to the user accessing personalized GUI 600. For example, general items 614 may be in tailored to the user in the sense that the enterprise-related graphical elements can be associated with an access control or permission list. That is, some users associated with managed network 300 may have special access or permission to certain resources available via personalized GUI 600. In this case, general items 614 may include enterprise-related graphical elements that are available to be viewed by the user.

Navigation bar 616 may include various graphical elements and/or buttons that are actuatable to navigate to different panes of personalized GUI 600. As shown in FIG. 6A, navigation bar 616 includes a button for "Home," "Requests," "Articles," "Notifications," and "More." In operation, actuating one of these buttons causes the mobile device to generate and display a graphical user interface associated with the actuated button. For example, if a user selects or actuates the button for "Home," the mobile device may generate and display the home page pane of personalized GUI 600 shown in FIG. 6A. In another example, if the user actuates the button for "Requests," the mobile device may generate and display the graphical user interface shown in FIG. 6D.

After examining the home page pane of personalized GUI 600, a user may decide to use search bar 604 to find a desired enterprise-related action. To do this, the user may actuate search bar 604 by touching or clicking search bar 604. Once actuated, the user may enter text on the mobile device may generate and display the search results pane of personalized GUI 600 shown in FIG. 6B. These search results may be related to the entered text.

Figure 6B:
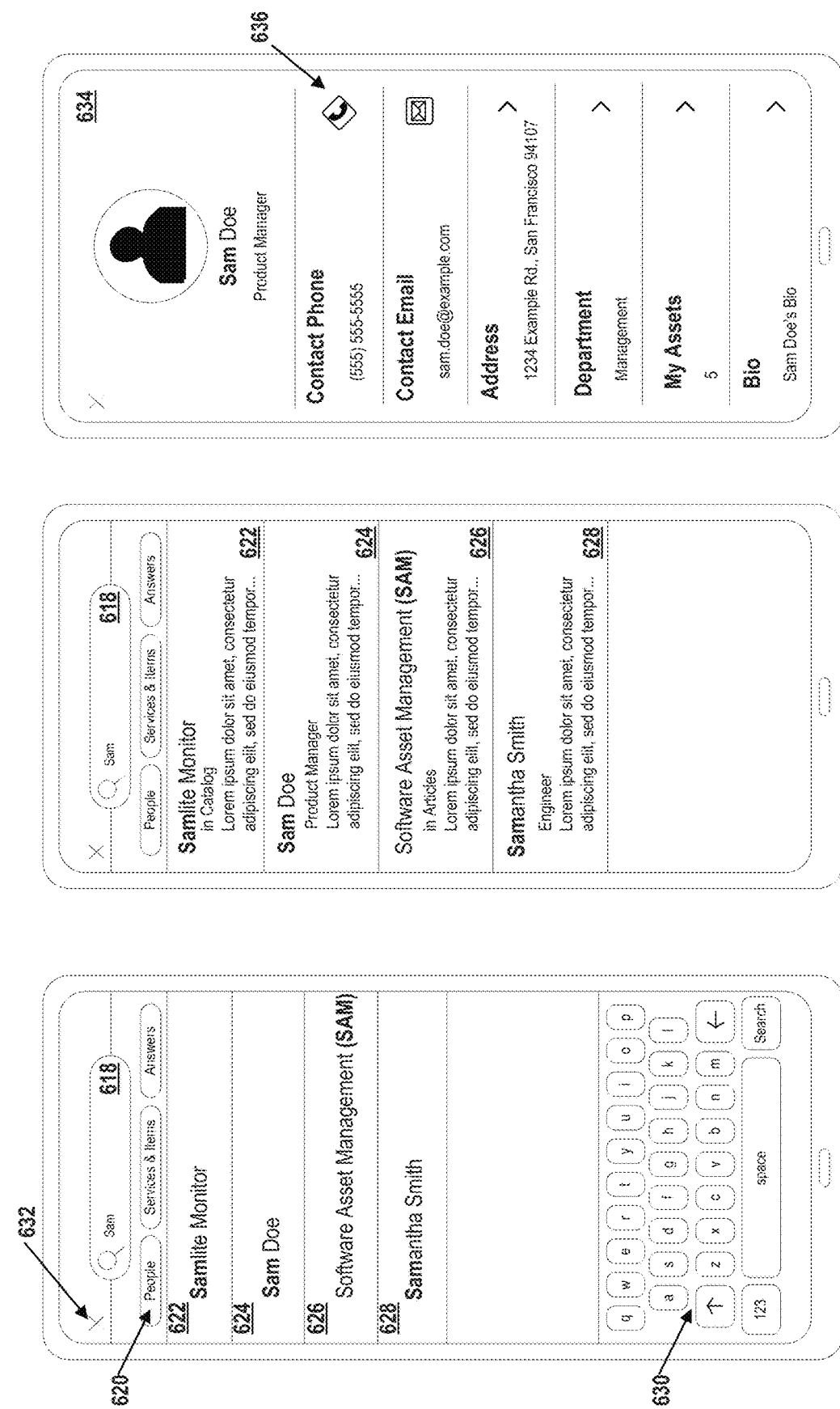
FIG. 6B depicts search results panes of the personalized GUI, in accordance with example embodiments.

FIG. 6B depicts search results panes of personalized GUI 600. FIG. 6B includes search bar 618, filter 620, search results 622, 624, 626, and 628, keyboard 630, navigation button 632, detailed search view 634, and buttons 636 across multiple panels.

Search bar 618 may include a predictive text feature that uses a database of commonly searched for enterprise-related actions in order to predict what action the user is trying to locate. The user may begin entering a string via keyboard 630 of the search results pane of personalized GUI 600. The search results pane of personalized GUI 600 may display these predictions as search results 622, 624, 626, and 628. For example, as shown in FIG. 6B, if the user enters the string of characters "Sam," the search results pane of personalized GUI 600 may display the enterprise-related actions that have the string "sam" in the title. In this example, search result 622 is an action relating to a "Samlite Monitor," search result 624 is an action relating to the person "Sam Doe," search result 626 is an action relating to "Software Asset Management (SAM)," and search result 628 is an action relating to the person "Samantha Smith."

Filter 620 may include a number of buttons that filter the predictions provided as search results 622, 624, 626, and 628. For example, filter 620 may include buttons that filter search results 622, 624, 626, and 628 to only include results related to "People," "Services & Items," or "Answers." This is beneficial as it allows a user to choose to view only relevant results. Although not shown, if the "People" button is actuated, search results 622 and 626 might be eliminated and search results 624 and 628 might remain, assuming that "Sam Doe" and "Samantha Smith" are tagged as "People."

Keyboard 630 may be an actuatable graphical element that allows a user to enter characters into search bar 618. In some embodiments, keyboard 630 may be implemented using the existing operating system on the mobile device or computing system. In other embodiments, keyboard 630 may be a customizable graphical element that includes additional buttons specifically related to the enterprise-related actions.

Navigation button 632 may include an actuatable graphical element that, when actuated, closes the search results pane of personalized GUI 600 and causes the mobile device to generate and display the home page pane of personalized GUI 600 of FIG. 6A.

Detailed search view 634 may include a detailed graphical representation of the actuated search result. For example, if search result 624 is actuated, the mobile device may generate and display detailed search view 634, providing additional details relating to search result 624. As shown in FIG. 6B, search result 624 corresponds to the user information of "Sam Doe." Thus, when search result 624 is activated, the mobile device generates and displays detailed search view 634, which includes detailed information relating to "Sam Doe," such as her contact phone number, contact email, address, department, assets, and biography.

Buttons 636 may include actuatable buttons that allow a user to interact with the information displayed in detailed search view 634. Buttons 636 may cause the mobile device to (i) generate and display further detailed panes of personalized GUI 600 or (ii) activate various functions of the mobile device. For example, if buttons 636 include a phone symbol button, then actuation of the phone symbol button may cause the mobile device to initiate a call to the number associated with the phone symbol button. In another example, if buttons 636 include a navigation button next to an address, then actuation of the navigation button may cause the mobile device to generate and display a further detailed pane (not shown) that includes a GPS location overlaid on a map. Other examples of further detailed panes and mobile device functions are possible.

In operation, a user may actuate search box 618 by entering characters via keyboard 630, such as the characters "Sam." In response to this actuation of search box 618, the mobile device may request, retrieve, and display search results 622, 624, 626, and 628, all of which contain the characters "sam." After the user is satisfied with the entered characters, the user may actuate the "Search" button of keyboard 630. In response to the actuation of the "Search" button, keyboard 630 may retract and the search results pane may display detailed information related to each of search results 622, 624, 626, and 628. As shown in the middle pane of FIG. 6B, once the "Search" button of keyboard 630 is actuated, search results 622, 624, 626, and 628 display detailed information, such as indicating that the "Samlite Monitor" is in the "Catalog" section of the information database and providing an additional description. From here, any of search results 622, 624, 626, and 628 can be actuated to display detailed search view 634. As shown in FIG. 6B, search results 624 was actuated and detailed search view 634 displays detailed information relating to the person "Sam Doe."

Turning back to FIG. 6A, in some situations, a user might want to view the enterprise-related actions assigned to him or her, instead of searching for specific information. In this situation, the user may actuate personalized items 606, labelled "My To-Dos." In response to this actuation, the mobile device may generate and display a custom tasks pane of personalized GUI 600, as shown in FIG. 6C.

Figure 6C:
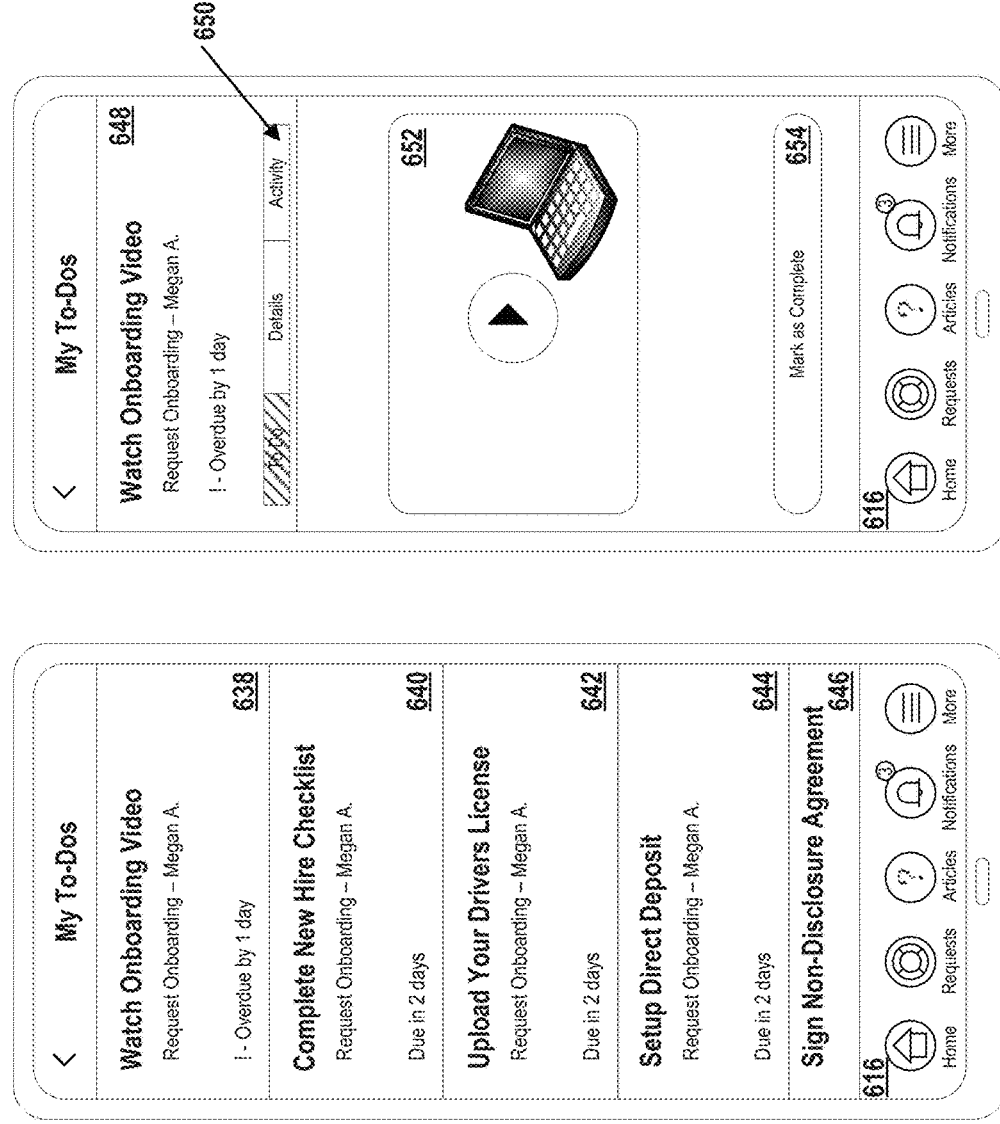
FIG. 6C depicts custom tasks panes of the personalized GUI, in accordance with example embodiments.

FIG. 6C may include custom tasks panes of personalized GUI 600 that include custom tasks 638, 640, 642, 644 and 646, as well as navigation bar 616 as described with respect to FIGS. 6A and 6B.

Custom tasks 638, 640, 642, 644, and 646 may be enterprise-related actions assigned to a user associated with managed network 300. For example, as shown in FIG. 6C, custom task 638 corresponds to the enterprise-related task of "Watch Onboarding Video," custom task 640 corresponds to the enterprise-related task of "Complete New Hire Checklist." Custom task 642 corresponds to the enterprise-related task of "Upload Your Driver's License," custom task 644 corresponds to the enterprise-related task of "Setup Direct Deposit," and custom task 646 corresponds to the enterprise-related task of "Sign Non-Disclosure Agreement." Other examples of custom tasks 638, 640, 642, 644, and 646 exist and can include any task relevant to users within an enterprise. Custom tasks 638, 640, 642, 644, and 646 may also be actuatable to cause the mobile device to generate and display a detailed task view within personalized GUI 600, as shown in the right pane of FIG. 6C.

Detailed task view 648 may include additional information related to the actuated custom task, as well as graphical elements that facilitate completion of the custom task. For example, as shown in FIG. 6C, detailed task view 648 includes information relating to the actuated custom task 638 of "Watch Onboarding Video." Detailed task view may include toggle 650, which manipulates what is displayed in detailed task view 648.

Toggle 650 may include an actuatable graphical element configured to manipulate the information shown in detailed task view 648. Toggle 650 may include options such as "To Do," "Details," and "Activity." The option for "To Do" may cause detailed task view 648 to display the enterprise-related task for which the user is to complete. The option for "Details" may cause detailed task view 648 to display a detailed description or instructions relating to the enterprise-related task. The option for "Activity" may cause detailed task view 648 to display an activity log that shows when the task was assigned, when it was viewed, and when it was completed. This may be beneficial for the user as it can show the user which parts have been completed or when the task was assigned.

Embedded media 652 may include media that facilitates the completion of the custom task associated with detailed task view 648. Embedded media 652 may include fillable forms or videos configured to be viewed with detailed task view 648. Accessing embedded media 652 within detailed task view 648 may be beneficial for a user because it allows the user to complete the custom task more quickly and avoids any issues with having to navigate to an external source to view a video or complete a form.

Button 654 may be configured to mark a custom task complete. In some embodiments, button 654 may only become available after the custom task is completed (i.e., after embedded media 652 is completely viewed). In other embodiments, button 654 may be persistent and available before the custom task is complete.

In one example, a new user may need to complete an onboarding training video as part of their first week of employment. To accomplish this, the user may actuate custom task 638, which may cause the mobile device to generate and display detailed task view 648. From there, the user can actuate embedded media 652, which is an embedded video in FIG. 6C. Detailed task view 648 may play the video via a media player of the mobile device or via software in personalized GUI 600. Once the user has viewed embedded media 652, the user can actuate button 654, which may remove custom task 638 from the custom task pane of personalized GUI 600.

While personalized GUI 600 can be used for completing enterprise-related tasks assigned to users, personalized GUI 600 can also be used to create and submit enterprise-related requests. To submit an enterprise-related request, a user can actuate personalized items 610 in FIG. 6A. Once actuated, the mobile device may generate and display the custom requests pane of personalized GUI 600 shown in FIG. 6D.

FIG. 6D depicts a custom requests pane of personalized GUI 600, which includes search bar 656, requests 658, assets 660, recently viewed items and services 662A, 662B, and 662C, as well as navigation bar 616.

Search bar 656 may function similarly to search bar 604 of FIG. 6A and search bar 618 of FIG. 6B, but may have access to search results that are limited to enterprise-related items pertaining to user requests. These items may include software or hardware support tickets, training requests, and/or general knowledge requests. Many examples of enterprise-related requests exist.

Figure 6E:
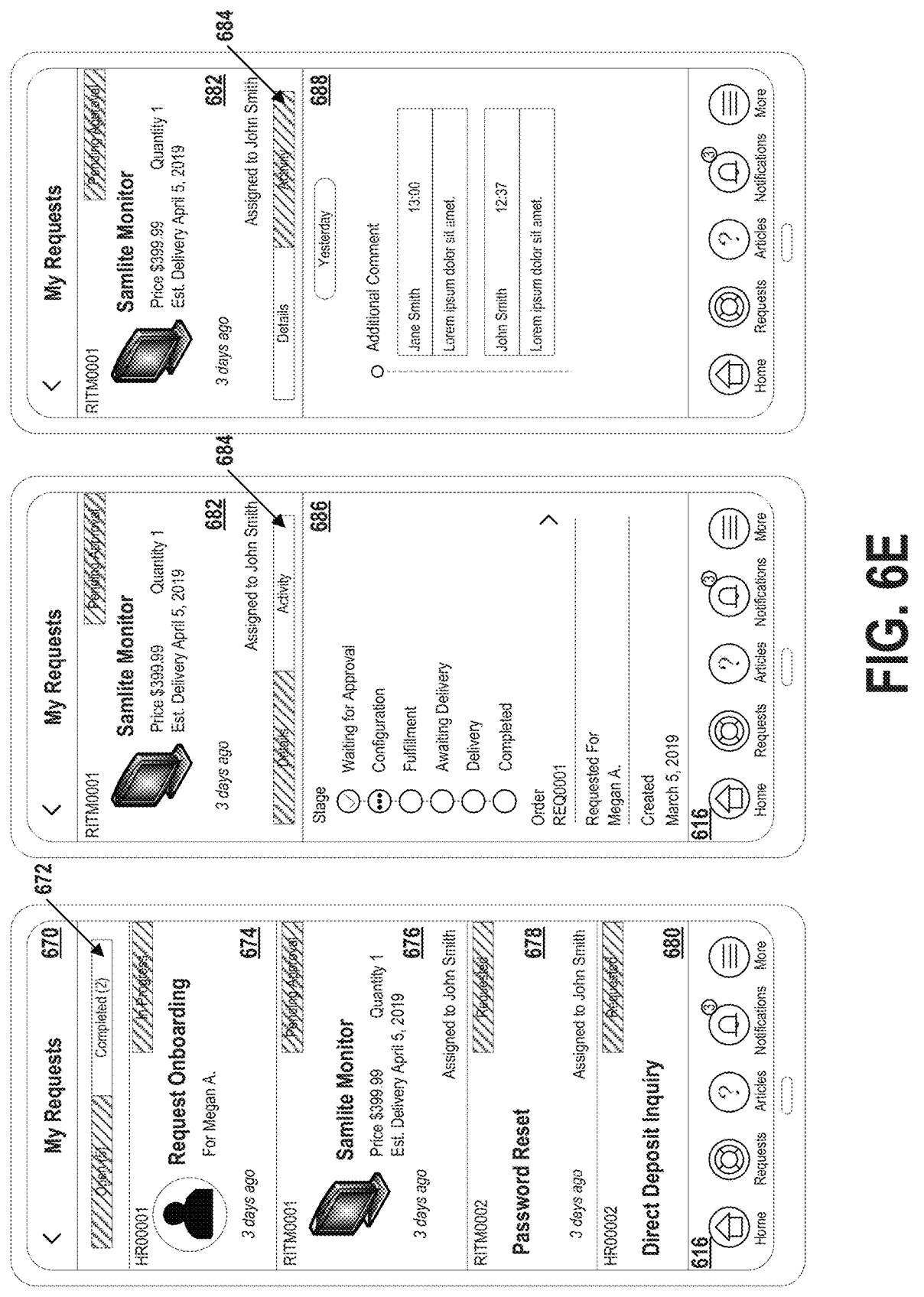

Requests 658 may include an actuatable graphic element configured to generate a detailed custom requests pane displaying the user's active and/or open requests. The detailed custom requests pane of personalized GUI 600 is illustrated in FIG. 6E.

Figure 6F:
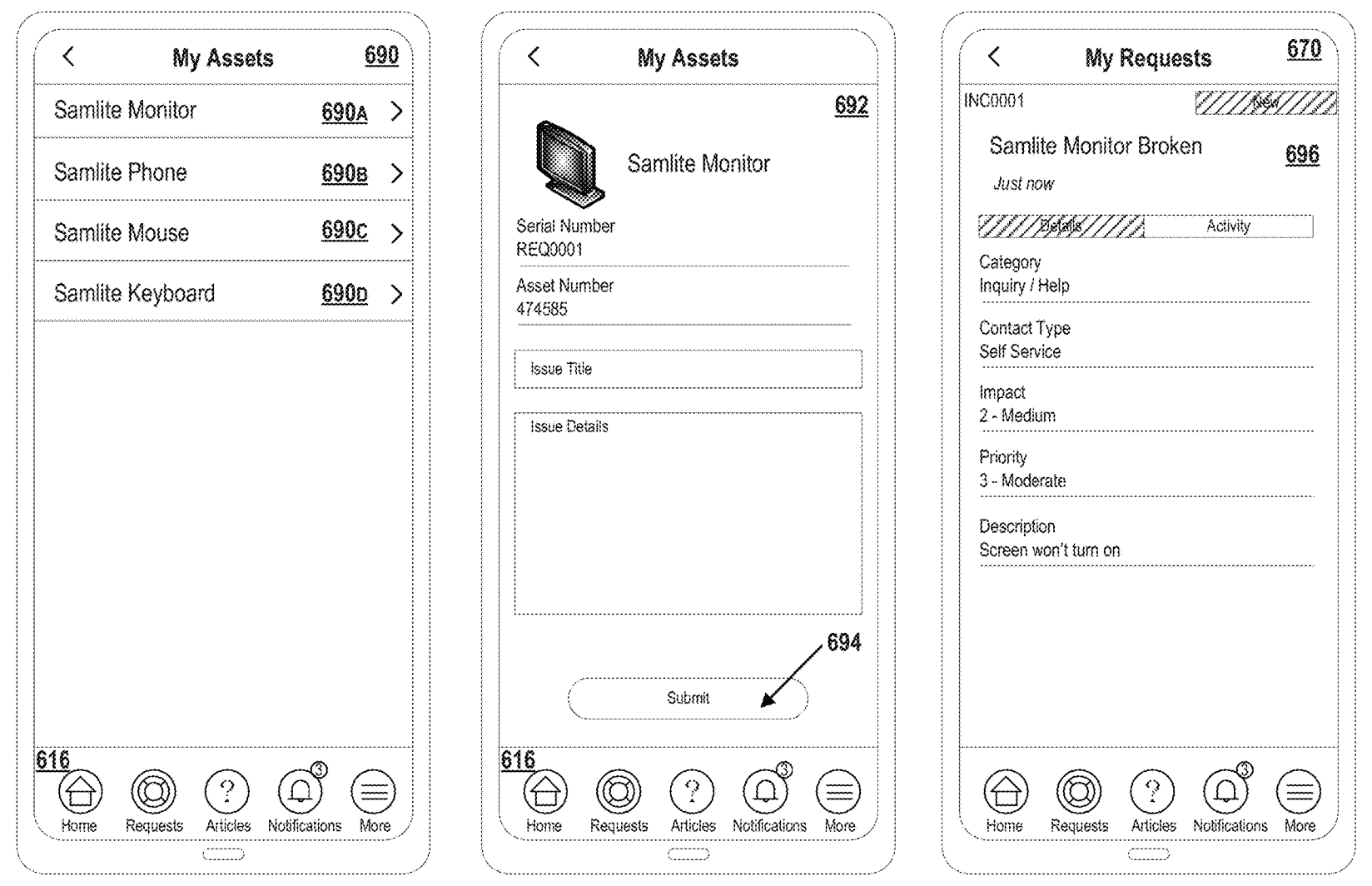

Assets 660 may include an actuatable graphic element configured to generate a detailed custom assets pane displaying the user's assets in the form of a hardware profile. The detailed custom requests pane of personalized GUI 600 is illustrated in FIG. 6F.

Recently viewed items and services 662 may include various actuatable graphical elements corresponding to recently viewed items and services, such as recently viewed items 662A and 662B, and recently viewed services 662C. These recently viewed items and services may have been viewed by a user via one of the other panes of personalized GUI 600 in FIGS. 6A, 6B and/or 6C. Recently viewed items 662A and 662B, and recently viewed services 662C may be actuatable and, when actuated, item 662A may cause the mobile device to generate and display detailed item view 664.

For example, as shown in FIG. 6D, detailed item view 664 displays detailed information relating to recently viewed item 662A, which is a "Samlite Monitor." The detailed information may include a description of the item, various forms and buttons that the user can fill out and toggle to indicate problems with the item, and technical specifications of the item. The detailed information may change depending on the type of recently viewed item or service 662. Once the detailed information is viewed by a user, the user may actuate one of buttons 666 to request the item.

Buttons 666 may include actuatable graphical elements configured to request the particular item shown in detailed item view 664. As shown in FIG. 6D, buttons 666 include an "Add to Cart" and an "Order Now" button. Actuation of buttons 666 may cause the mobile device to generate and display a notification 668 at the top of detailed item view 664.

Notification 668 may include a graphical element configured to display a notification for a short period of time. Notification 668 may also be actuatable and configured to display another pane of personalized GUI 600. For example, as shown in the right pane of FIG. 6D, notification 668 includes the text "Items added to your cart," indicating that the particular item shown in detailed item view 664 has been added to a virtual shopping cart for purchase and/or request. Notification 668 also includes the text "View cart," which may be actuatable and configured to cause the mobile device to generate and display a pane of personalized GUI 600 that shows the items in the user's virtual shopping cart (not shown).

In operation, once an item or service is ordered via the user's virtual shopping cart, the item or service may appear in requests 658. To view the user's requests, requests 658 can be actuated, which may cause the mobile device to generate and display the custom requests pane of personalized GUI 600 shown in FIG. 6E.

FIG. 6E includes custom requests pane 670 of personalized GUI 600, which includes toggle 672, requests 674, 676, 678, and 680, as well as navigation bar 616.

Custom requests pane 670 includes a list of open and completed enterprise-related requests for a particular user. Enterprise-related requests may include actions or items requested by the user. These can include, among other things, training requests, hardware requests, information requests, and human resource requests.

Toggle 672 may include an actuatable graphical element configured to manipulate the information shown in custom requests pane 670. For example, toggle 672 may include options such as "Open" and "Completed." The option for "Open" may cause custom requests pane 670 to display the enterprise-related requests that are incomplete. The option for "Completed" may cause custom requests pane 670 to display the enterprise-related requests that are completed or fulfilled. This may be beneficial for the user as it can show the user which requests have yet to be completed while still allowing the user to view past requests that have been completed.

Requests 674, 676, 678, and 680 may include the active or completed enterprise-related requests that pertain to the user accessing personalized GUI 600, depending on the actuated option in toggle 672. As shown in FIG. 6E, "Open" is selected in toggle 672 (the shading indicates a toggle option is selected), indicating that requests 674, 676, 678, and 680 are still active and not completed. In an example, request 674 may be the enterprise-related request for "Request Onboarding," request 676 may be the enterprise-related request for "Samlite Monitor," request 678 may be the enterprise-related request for "Password Reset," and request 680 may be the enterprise-related request for "Direct Deposit Inquiry." Requests 674, 676, 678, and 680 may be actuatable to display more detailed information relating to the request in detailed request view 682.

Detailed request view 682 may include detailed information relating to the actuated request from requests 674, 676, 678, and 680. For example, detailed request view 682 in FIG. 6E depicts detailed information regarding request 676. Detailed request view 682 may also include toggle 684, which switches the displayed view between details 686 and activity 688.

Toggle 684 may include an actuatable graphical element configured to manipulate the information shown in detailed request view 682. For example, Toggle 684 has an option for "Details," and "Activity." Actuation of "Details" may cause detailed request view 682 to display details 686, while actuation of "Activity" may cause detailed request view 682 to display activity 688.

Details 686 may include detailed information relating to the request being displayed in detailed request view 682. This detailed information may include a request number, the identity of the user that submitted the request, the date the request was created, and the progress stage of the request (i.e., waiting for approval, configuration, fulfillment, awaiting delivery, delivery, or completed). As shown in FIG. 6E, details 686 may provide the user with a visual indication of the stage of the request in the form of check marks and ellipses. For example, details 686 shows that the request for the "Samlite Monitor" has been approved and is now in the configuration stage.

Activity 688 may include comments relating to the request being displayed in detailed request view 682. For example, as shown in FIG. 6E, activity 688 shows comments from different users relating to the request. These comments may be submitted from other users responsible for fulfilling the request. Activity 688 may be beneficial to the user that submitted the request because the comments could help explain any delays or problems with the completion of the request.

Turning back to FIG. 6D, in some examples, completion of a request may add an item to assets 660. In these examples, the completed request may include delivery of a new hardware device to the user (i.e., the "Samlite Monitor."). After the request is completed, a user may view the hardware devices by actuating assets 660, which may cause the mobile device to generate and display custom assets pane 690 of personalized GUI 600 shown in FIG. 6F.

FIG. 6F may include custom assets pane 690, which includes assets 690A, 690B, 690C, and 690D, as well as navigation bar 616. The assets may, in combination, represent a hardware profile for the user.

Assets 690A, 690B, 690C, and 690D may be actuatable graphical elements that cause the mobile device to generate and display detailed assets view 692. A user may actuate assets 690A, 690B, 690C, and 690D in order to seek information about, or submit a request related to, a particular asset. For example, as shown in FIG. 6F, asset 690A is a "Samlite Monitor," asset 690B is a "Samlite Phone," asset 690C is a "Samlite Mouse," and asset 690D is a "Samlite Keyboard."

Detailed asset view 692 may include a pane of personalized GUI 600 that displays detailed information regarding the actuated asset from assets 690A, 690B, 690C, and 690D. Detailed asset view 692 may additionally and/or alternatively provide the user with graphical elements configured to submit a request relating to the displayed asset. The request may be, for example, a support ticket relating to a malfunctioning aspect of the display asset. As shown in the middle pane of FIG. 6F, detailed asset view 692 displays detailed information regarding asset 690A, the "Samlite Monitor." As shown, detailed asset view 692 includes the serial number and asset number of the "Samlite Monitor," as well as fillable forms that allow the user to enter a string of characters defining the title and details of the issue relating to the "Samlite Monitor."

Button 694 may include an actuatable graphical element configured to submit a request relating to the asset displayed in detailed asset view 692. Actuation of button 694 may (i) cause a new request to be generated, which may be sent to other users responsible for fixing and/or addressing the request, and (ii) cause the new request to be added to the user's requests in custom requests pane 670 shown in FIG. 6F.

Custom requests pane 670 shown in FIG. 6F is the same as custom requests pane 670 shown in FIG. 6E but is reproduced to more clearly illustrate the flow of request creation via detailed asset view 692. For example, custom requests pane 670 may display to the user that the request was generated and also provide details regarding the request. As shown in the last pane of FIG. 6F, custom requests pane 670 includes new request details 696.

New request details 696 may include information relating to the newly submitted request via detailed asset view 692. New request details 696 may include the same similar information as detailed request view 682, such as details regarding the request (i.e., the category, contact type, impact, priority, and description, as well as the activity relating to the request.)

VI. Example Operations

Figure 7:
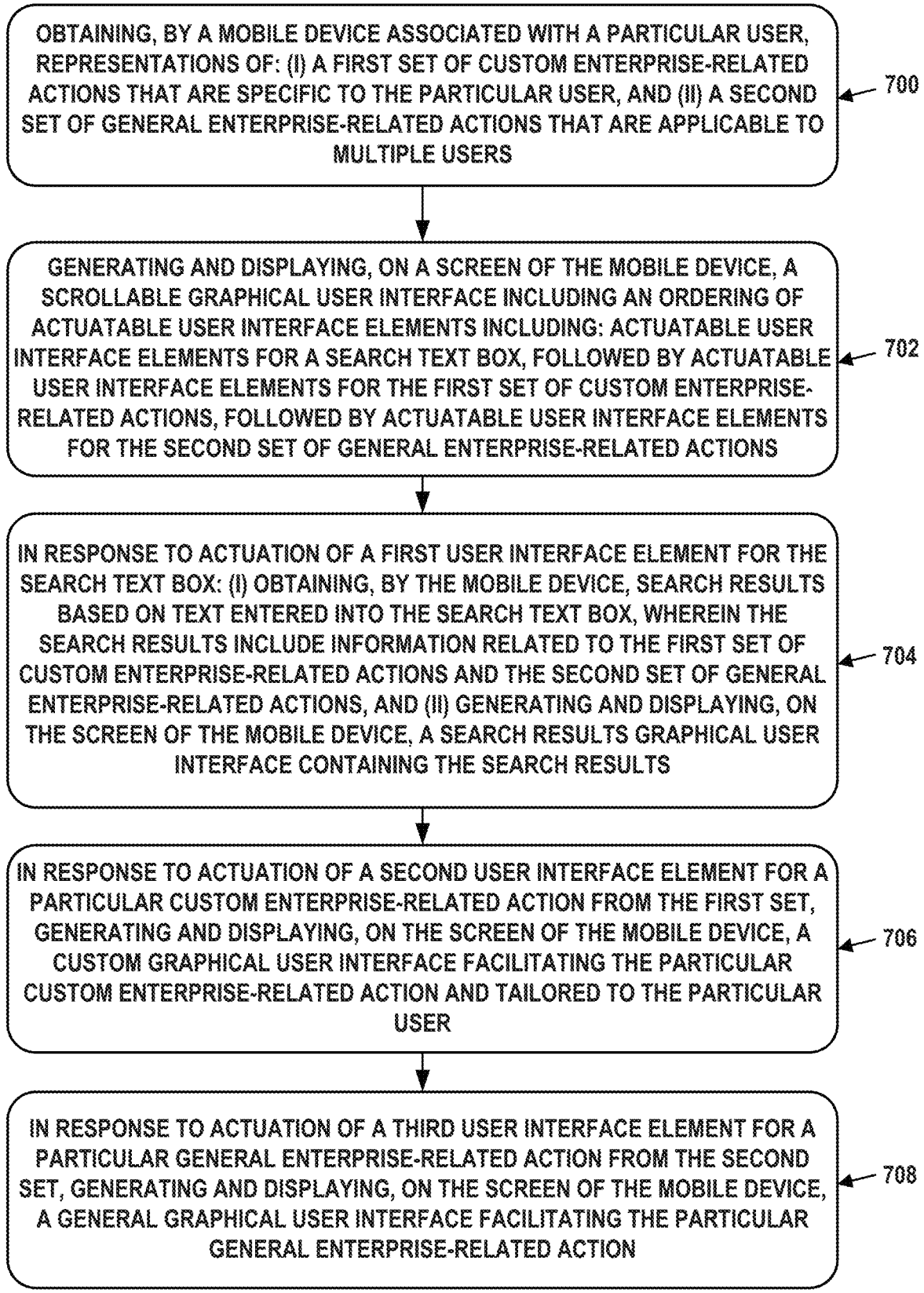
FIG. 7 is a flow chart, in accordance with example embodiments.

FIG. 7 is a flow chart illustrating an example embodiment. The process illustrated by FIG. 7 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 7 may be simplified by the removal of any one or more of the features shown therein. Further, these embodiments may be combined with features, aspects, and/or implementations of any of the previous figures or otherwise described herein.

Block 700 of FIG. 7 involves obtaining, by a mobile device associated with a particular user, representations of: (i) a first set of custom enterprise-related actions that are specific to the particular user, and (ii) a second set of general enterprise-related actions that are applicable to multiple users.

Block 702 involves generating and displaying, on a screen of the mobile device, a scrollable graphical user interface including an ordering of actuatable user interface elements including: actuatable user interface elements for a search text box, followed by actuatable user interface elements for the first set of custom enterprise-related actions, followed by actuatable user interface elements for the second set of general enterprise-related actions.

Block 704 involves, in response to actuation of a first user interface element for the search text box: (i) obtaining, by the mobile device, search results based on text entered into the search text box, wherein the search results include information related to the first set of custom enterprise-related actions and the second set of general enterprise-related actions, and (ii) generating and displaying, on the screen of the mobile device, a search results graphical user interface containing the search results.

Block 706 involves, in response to actuation of a second user interface element for a particular custom enterprise-related action from the first set, generating and displaying, on the screen of the mobile device, a custom graphical user interface facilitating the particular custom enterprise-related action and tailored to the particular user.

Block 708 involves, in response to actuation of a third user interface element for a particular general enterprise-related action from the second set, generating and displaying, on the screen of the mobile device, a general graphical user interface facilitating the particular general enterprise-related action.

In some embodiments, the general graphical user interface is also tailored to the particular user. In some embodiments, the general graphical user interface is not tailored to the particular user.

In some embodiments, the ordering of the actuatable user interface elements is pre-defined based on frequency of use measured for the search text box, the custom enterprise-related actions, and the general enterprise-related actions.

In some embodiments, the search results include information from employee, knowledgebase, and service databases, wherein the search results graphical user interface comprises actuatable user interface elements for filtering of the search results to that of one or more of the employee, knowledgebase, and service databases, and wherein each of the search results is actuatable to generate and display a further graphical user interface that includes further information from the respective search result.

In some embodiments, the mobile device is associated with a managed network, wherein an access control list for the particular user is stored in a database disposed within the managed network, and wherein the search results omit any information that the particular user is not permitted to obtain in accordance with the access control list. For example, some users may have managerial responsibilities within an enterprise and thus may have access to additional information regarding other users, such as other users' overdue tasks and requests. Accordingly, adjustment of the access control list may affect the amount or type of information displayed on the graphical user interface.

In some embodiments, facilitating the particular custom enterprise-related action comprises providing embedded media relating to the particular custom enterprise-related action that is configured to be viewed within the custom graphical user interface.

In some embodiments, the custom enterprise-related actions include obtaining a list of hardware or software assets assigned to the particular user, and obtaining a list of requests made by the particular user. In these embodiments, the custom graphical user interface displays the list of hardware or software assets assigned to the particular user, and wherein each of the assets in the list of hardware or software assets is actuatable to generate and display a further graphical user interface that includes an indication of a related request from the list of requests. In these embodiments, the custom graphical user interface displays the list of requests made by the particular user, and wherein each of the requests in the list of requests is actuatable to generate and display a further graphical user interface that includes an indication of a related asset from the list of hardware or software assets.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:
    obtaining a first set of custom enterprise-related actions and a second set of general enterprise-related actions, wherein the first set of custom enterprise-related actions comprises tasks that have been assigned to a particular user of a managed network, requests that have been submitted in association with the particular user, or both;
    determining a frequency of usage of the second set of general enterprise-related actions by a plurality of users of the managed network, wherein the second set of general enterprise-related actions comprises tasks or services crowd-sourced from the plurality of users;
    selecting a subset of the second set of general enterprise-related actions for display based on the frequency of usage of the second set of general enterprise-related actions by the plurality of users;
    generating and displaying, on a screen of a mobile device associated with the particular user, a first actuatable user interface element comprising a search text box, a first actuatable user interface elements associated with the first set of custom enterprise-related actions, and a second set of actuatable user interface elements associated with the subset of the second set of general enterprise-related actions;
    monitoring a first frequency of actuation of the first actuatable user interface element, a second frequency of actuation of the first set of actuatable user interface elements, and a third frequency of actuation of the second set of actuatable user interface elements;
    updating display of the first actuatable user interface element, the first set of actuatable user interface elements, and the second set of actuatable user interface elements at positions relative to one another based on the first frequency, the second frequency, and the third frequency;
    displaying, on the screen of the mobile device, a first graphical user interface (GUI) in response to receiving an actuation of the first actuatable user interface element, a second GUI in response to receiving an actuation of one of the first set of actuatable user interface elements, and a third GUI in response to receiving an actuation of one of the second set of actuatable user interface elements, wherein the second GUI comprises a list of actuatable asset user interface elements corresponding to hardware assets, software assets, or both, assigned to the particular user, wherein each actuatable asset user interface element of the list of actuatable asset user interface elements is actuatable via the second GUI; and
    displaying a fourth GUI in response to receiving an actuation of an actuatable asset user interface element of the list of actuatable asset user interface elements, wherein the fourth GUI comprises a list of requests associated with an asset corresponding to the actuatable asset user interface element, and each request of the list of requests comprises a task to be performed on the asset and assigned to another user of the managed network.

2. The computer-implemented method of claim 1, wherein obtaining the second set of general enterprise-related actions is based on an access control or a permission list.

3. The computer-implemented method of claim 1, wherein updating display of the first actuatable user interface element, the first set of actuatable user interface elements, and the second set of actuatable user interface elements comprises displaying the first actuatable user interface element at a first portion of the screen of the mobile device, displaying the first set of actuatable user interface elements at a second portion of the screen, displaying the second set of actuatable user interface elements at a third portion of the screen, and ordering the first portion, the second portion, and the third portion along a top, a middle, or a bottom of the screen such that the set of actuatable user interface elements having the highest frequency of actuation are displayed at the top of the screen and the set of actuatable user interface elements having the lowest frequency of actuation are displayed at the bottom of the screen.

4. The computer-implemented method of claim 1, comprising displaying search results via the first GUI based on a user input entered via the search text box, wherein the search results include information from employee, knowledgebase, and service databases, wherein the first GUI comprises actuatable user interface elements for filtering of the search results to that of one or more of the employee, knowledgebase, and service databases, and wherein each of the search results is actuatable to generate and display a respective GUI that includes further information from the respective search result.

5. The computer-implemented method of claim 1, comprising displaying search results via the first GUI based on a user input entered via the search text box, wherein an access control list for the particular user is stored in a database disposed within the managed network, and wherein the search results omit any information that the particular user is not permitted to obtain in accordance with the access control list.

6. The computer-implemented method of claim 1, comprising providing embedded media relating to a custom enterprise-related action of the first set of custom enterprise-related actions via the second GUI.

7. The computer-implemented method of claim 1, wherein updating display of the first actuatable user interface element, the first set of actuatable user interface elements, and the second set of actuatable user interface elements comprises changing the arrangement of the first actuatable user interface element, the first set of actuatable user interface elements, and the second set of actuatable user interface elements relative to one another based on the first frequency, the second frequency, the third frequency, or a combination thereof.

8. The computer-implemented method of claim 1, comprising displaying search results via the first GUI based on a user input entered via the search text box, wherein the search results comprise a third set of actuatable user interface elements associated with at least one of the first set of custom enterprise-related actions, at least one of the second set of general enterprise-related actions, or both.

9. The computer-implemented method of claim 1, comprising:
 determining an updated frequency of usage of the second set of general enterprise-related actions by the plurality of users;
 selecting an updated subset of the second set of general enterprise-related actions for display based on the updated frequency of usage of the second set of general enterprise-related actions by the plurality of users; and
 generating and displaying, an updated second set of actuatable user interface elements associated with the updated subset of the second set of general enterprise-related actions.

10. The computer-implemented method of claim 1, wherein each request of the list of requests is submitted by the particular user.

11. A mobile device associated with a particular user of a managed network, wherein the mobile device is configured to:
 obtain a first set of custom enterprise-related actions and a second set of general enterprise-related actions, wherein the first set of custom enterprise-related actions comprises tasks that have been assigned to the particular user, requests that have been submitted in association with the particular user, or both;
 determine a frequency of usage of the second set of general enterprise-related actions by a plurality of users of the managed network, wherein the second set of general enterprise-related actions comprises tasks or services crowd-sourced from the plurality of users;
 select a subset of the second set of general enterprise-related actions for display based on the frequency of usage of the second set of general enterprise-related actions by the plurality of users;
 generate and display, on a screen of the mobile device, a first actuatable user interface element comprising a search text box, a first set of actuatable user interface elements associated with the first set of custom enterprise-related actions, and a second set of actuatable user interface elements associated with the subset of the second set of general enterprise-related actions;
 monitor a first frequency of actuation of the first actuatable user interface element, a second frequency of actuation of the first set of actuatable user interface elements, and a third frequency of actuation of the second set of actuatable user interface elements;
 update display of the first actuatable user interface element, the first set of actuatable user interface elements, and the second set of actuatable user interface elements at positions relative to one another based on the first frequency, the second frequency, and the third frequency;
 display, on the screen of the mobile device, a first graphical user interface (GUI) in response to receiving an actuation of the first actuatable user interface element, a second GUI in response to receiving an actuation of one of the first set of actuatable user interface elements, and a third GUI in response to receiving an actuation of one of the second set of actuatable user interface elements, wherein the second GUI comprises a list of open requests submitted by the particular user, each open request of the list of open requests comprises a task to be performed on a hardware asset, a software asset, or both that is assigned to the particular user, and the second GUI displays assignment of the task to an additional user of the managed network.

12. The mobile device of claim 11, wherein the mobile device is configured to display the second set of actuatable user interfaces based on an access control or a permission list.

13. The mobile device of claim 11, wherein the mobile device is configured to display the first set of actuatable user interface element, the first set of actuatable user interface elements, and the second set of actuatable user interface elements by grouping the first actuatable user interface element together at a first portion of the screen of the mobile device, grouping the first set of actuatable user interface elements together at a second portion of the screen, grouping the second set of actuatable user interface elements together at a third portion of the screen, and ordering the first portion, the second portion, and the third portion in decreasing frequency from a top of the screen to a bottom of the screen.

14. The mobile device of claim 11, wherein the mobile device is configured to display search results via the first GUI based on a user input entered via the search text box, wherein the search results include information from employee, knowledgebase, and service databases, wherein the first GUI comprises actuatable user interface elements for filtering of the search results to that of one or more of the employee, knowledgebase, and service databases, and wherein each of the search results is actuatable to generate and display a respective GUI that includes further information from the respective search result.

15. The mobile device of claim 11, comprising displaying search results via the first GUI based on a user input entered via the search text box, wherein an access control list for the particular user is stored in a database disposed within the managed network, and wherein the search results omit any information that the particular user is not permitted to obtain in accordance with the access control list.

16. The mobile device of claim 11, wherein the mobile device is configured to provide embedded media relating to a custom enterprise-related action of the first set of custom enterprise-related actions via the second GUI.

17. The mobile device of claim 11, wherein each open request of the list of open requests is actuatable via the second GUI, the mobile device is configured to display a fourth GUI in response to receiving an actuation of an open request of the list of open requests, and the fourth GUI comprises additional details associated with the open request.

18. The mobile device of claim 17, wherein the additional details comprise a process stage of the open request, a comment submitted by the additional user, or both.

19. The mobile device of claim 11, wherein the second GUI comprises a list of completed requests previously submitted by the particular user, and each completed request of the list of completed request comprises an additional task performed on an additional hardware asset, an additional software asset, or both that is assigned to the particular user, the additional task having been completed by another user of the managed network.

20. An article of manufacture including a non-transitory computer-readable medium, having stored thereon program instructions that, upon execution by a mobile device associated with a particular user of a managed network, cause the mobile device to perform operations comprising:

obtaining a first set of custom enterprise-related actions and a second set of general enterprise-related actions, wherein the first set of custom enterprise-related actions comprises tasks that have been assigned to the particular user, requests that have been submitted in association with the particular user, or both;

determining a frequency of usage of the second set of general enterprise-related actions by a plurality of users of the managed network, wherein the second set of general enterprise-related actions comprises tasks or services crowd-sourced from the plurality of users;

selecting a subset of the second set of general enterprise-related actions for display based on the frequency of usage of the second set of general enterprise-related actions by the plurality of users;

generating and displaying, on a screen of the mobile device, a first actuatable user interface element comprising a search text box, a first set of actuatable user interface elements associated with the first set of custom enterprise-related actions, and a second set of actuatable user interface elements associated with the subset of the second set of general enterprise-related actions;

monitoring a first frequency of actuation of the first actuatable user interface element, a second frequency of actuation of the first set of actuatable user interface elements, and a third frequency of actuation of the second set of actuatable user interface elements;

updating display of the first actuatable user interface element, the first set of actuatable elements, and the second set of actuatable elements at positions relative to one another based on the first frequency, the second frequency, and the third frequency;

displaying, on the screen of the mobile device, a first graphical user interface (GUI) in response to receiving an actuation of the first actuatable user interface element, a second GUI in response to receiving an actuation of one of the first set of actuatable user interface elements, and a third GUI in response to receiving an actuation of one of the second set of actuatable user interface elements, wherein the second GUI comprises a list of actuatable asset user interface elements corresponding to hardware assets, software assets, or both, assigned to the particular user, and each actuatable asset user interface element of the list of actuatable asset user interface elements is actuatable via the second GUI; and displaying a fourth GUI in response to receiving an actuation of an actuatable asset user interface element of the list of actuatable asset user interface elements, wherein the fourth GUI comprises a list of requests associated with an asset corresponding to the actuatable asset user interface element, and each request of the list of requests comprises a task to be performed on the asset and assigned to another user of the managed network.

* * * * *